(12) United States Patent
Pullela et al.

(10) Patent No.: US 11,252,227 B2
(45) Date of Patent: Feb. 15, 2022

(54) SYSTEM AND METHOD OF MANAGING FLOW STATE IN STATEFUL APPLICATIONS (71) Applicant: Cisco Technology, Inc., San Jose, CA (US)

(72) Inventors: Venkat Pullela, San Jose, CA (US); Srivatsa Sangli, San Jose, CA (US); Anand Akella, San Jose, CA (US); Subhav Mital, San Jose, CA (US)

(73) Assignee: CISCO TECHNOLOGY, INC., San Jose, CA (US)

(*) Notice: Subject to any disclaimer, the term of this patent is extended or adjusted under 35 U.S.C. 154(b) by 1094 days.

(21) Appl. No.: 15/391,343

(22) Filed: Dec. 27, 2016

(65) Prior Publication Data

US 2018/0183865 A1 Jun. 28, 2018

(51) Int. Cl.
*H04L 29/08* (2006.01)
*H04L 12/851* (2013.01)
*H04L 12/803* (2013.01)

(52) U.S. Cl.
CPC ........ *H04L 67/1012* (2013.01); *H04L 47/125* (2013.01); *H04L 47/2483* (2013.01); *H04L 67/1002* (2013.01)

(58) Field of Classification Search
CPC ............. H04L 67/1012; H04L 67/1002; H04L 47/125; H04L 47/2483; H04L 67/22; H04L 43/12; H04L 67/02; H04L 43/0876; H04L 67/10; H04L 67/1095; H04L 67/2838

USPC ................................. 709/201, 223, 224, 238
See application file for complete search history.

(56) References Cited

U.S. PATENT DOCUMENTS

| | | | | |
|---|---|---|---|---|
| 2011/0261811 A1* | 10/2011 | Battestilli | ........... | H04L 67/1025 370/389 |
| 2014/0369204 A1* | 12/2014 | Anand | ................... | H04L 47/125 370/235.1 |
| 2016/0182378 A1* | 6/2016 | Basavaraja | ........... | H04L 45/745 370/235 |
| 2018/0176294 A1* | 6/2018 | Vacaro | ..................... | H04L 45/38 |
| 2018/0316789 A1* | 11/2018 | Sansom | ............ | H04M 3/42382 |

OTHER PUBLICATIONS

Extended European Search Report from the European Patent Office, dated May 24, 2018, 7 pages, for the corresponding European Patent Application No. EP 17208805.6.

\* cited by examiner

*Primary Examiner* — Hitesh Patel
(74) *Attorney, Agent, or Firm* — Polsinelli PC (57) ABSTRACT

Disclosed is a method for managing flow tables at a switch in a network. The method includes establishing a static rule to distribute a first flow to a first server and a second flow to a second server and monitoring a first load on the first server and a second load on a second server. When, based on the monitoring, the first server is running at capacity and the third flow is to be distributed to the first server according to the static rule, the method includes establishing an exception to the static rule to yield an exception rule, distributing the third flow to a third server with capacity according to the exception rule and storing a flow table for the third flow at a switch, wherein the switch does not store a static rule flow table for the static rule.

17 Claims, 5 Drawing Sheets

SYSTEM AND METHOD OF MANAGING FLOW STATE IN STATEFUL APPLICATIONS

TECHNICAL FIELD

The present disclosure relates to flow tables and more particularly to an approach of only maintaining, at a switch, flow tables for flows distributed according to exception rules to a static rule.

BACKGROUND

Traffic rates have increased in datacenters, thus increasing the need for higher capacity switches. The need for higher capacity switches also increases the need for bigger look-up tables in respective switches. Bigger tables are costly due to high cost of internal memories in ASICs that operate at high speeds. As the traffic need and capacity of the switches increases, flow table size requirements also increase. Flow tables increase more than other tables, like routing or forwarding tables, as some of the aggregation techniques used to manage routing and forwarding tables are not applicable to flows.

Maintaining flow state in a switch is costly due to the large number of fields that define the flow. Managing the associated flow state could also be large. These issues cause developers of switches to abandon the traditional method of keeping track of all flows. Some switches are designed to aggregate flows; other switches sample the flows and perform statistical analysis. None of these approaches are a substitute for full flow table support.

Load balancing also represents an issue with respect to flow tables. Flow based functionality that used to be part of any switch, like firewalls and load balancers, are moving out of the switch due to large flow table requirements, in the order of 1M-10M flows. Hence, external stand-alone load balancers are being used. However, there are no terabit load balancers. Another major issue is lack of availability of a high capacity load balancer.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which.

DESCRIPTION OF EXAMPLE EMBODIMENTS

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

The present disclosure addresses the issues raised above with respect to storing and managing large flow tables on switches. The disclosure provides a system, method and computer-readable storage device embodiments. The method embodiment includes establishing a static rule to distribute a first flow to a first server and a second flow to a second server and monitoring a first load on the first server and a second load on the second server. When, based on the monitoring, the first server is running at capacity and a third flow is to be distributed to the first server according to the static rule, the method includes establishing an exception to the static rule to yield an exception rule, distributing the third flow to a third server with capacity according to the exception rule and storing a flow table for the third flow at a switch, wherein the switch does not store a static rule flow table for the static rule.

By only storing the flow tables for the exception to the status rules, the management of flow tables can require much less memory on the switch and thus become more feasible.

Description

The present disclosure addresses the issues raised above with respect to storing and managing large flow tables on switches. The disclosure provides a system, method and computer-readable storage device embodiments. First a general example system shall be disclosed in FIG. 1 which can provide some basic hardware components making up a server, node or other computer system. Next, several features of the concepts shall be presented in FIGS. 2A-2C. Finally, FIG. 3 shall present an example method embodiment.

Figure 1:
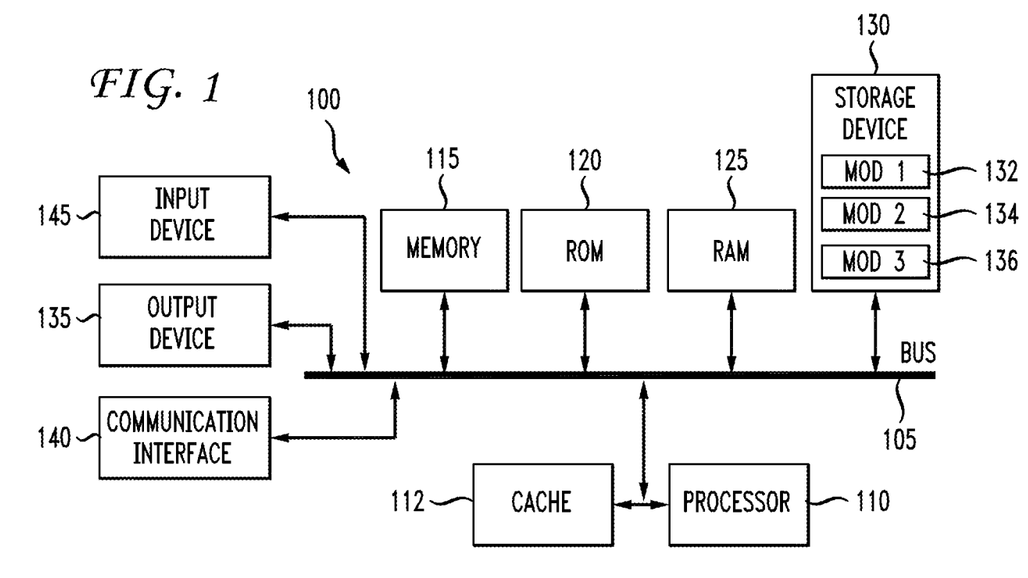
FIG. 1 illustrates an example system configuration.

FIG. 1 illustrates a conventional computing system architecture 100 wherein the components of the system are in electrical communication with each other using a bus 105. Exemplary system 100 includes a processing unit (CPU or processor) 110 and a system bus 105 that couples various system components including the system memory 115, such as read only memory (ROM) 120 and random access memory (RAM) 125, to the processor 110. The system 100 can include a cache of high-speed memory connected directly with, in close proximity to, or integrated as part of the processor 110. The system 100 can copy data from the memory 115 and/or the storage device 130 to the cache 112 for quick access by the processor 110. In this way, the cache can provide a performance boost that avoids processor 110 delays while waiting for data. These and other modules can control or be configured to control the processor 110 to perform various actions. Other system memory 115 may be available for use as well. The memory 115 can include multiple different types of memory with different performance characteristics. The processor 110 can include any general purpose processor and a hardware module or software module, such as module 1 132, module 2 134, and module 3 136 stored in storage device 130, configured to control the processor 110 as well as a special-purpose processor where software instructions are incorporated into the actual processor design. The processor 110 may essentially be a completely self-contained computing system, containing multiple cores or processors, a bus, memory controller, cache, etc. A multi-core processor may be symmetric or asymmetric.

To enable user interaction with the computing device 100, an input device 145 can represent any number of input mechanisms, such as a microphone for speech, a touch-sensitive screen for gesture or graphical input, keyboard, mouse, motion input, speech and so forth. An output device 135 can also be one or more of a number of output mechanisms known to those of skill in the art. In some instances, multimodal systems can enable a user to provide multiple types of input to communicate with the computing device 100. The communications interface 140 can generally govern and manage the user input and system output. There is no restriction on operating on any particular hardware arrangement and therefore the basic features here may easily be substituted for improved hardware or firmware arrangements as they are developed.

Storage device 130 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 125, read only memory (ROM) 120, and hybrids thereof.

The storage device 130 can include software modules 132, 134, 136 for controlling the processor 110. Other hardware or software modules are contemplated. The storage device 130 can be connected to the system bus 105. In one aspect, a hardware module that performs a particular function can include the software component stored in a computer-readable medium in connection with the necessary hardware components, such as the processor 110, bus 105, display 135, and so forth, to carry out the function.

Figure 2A:
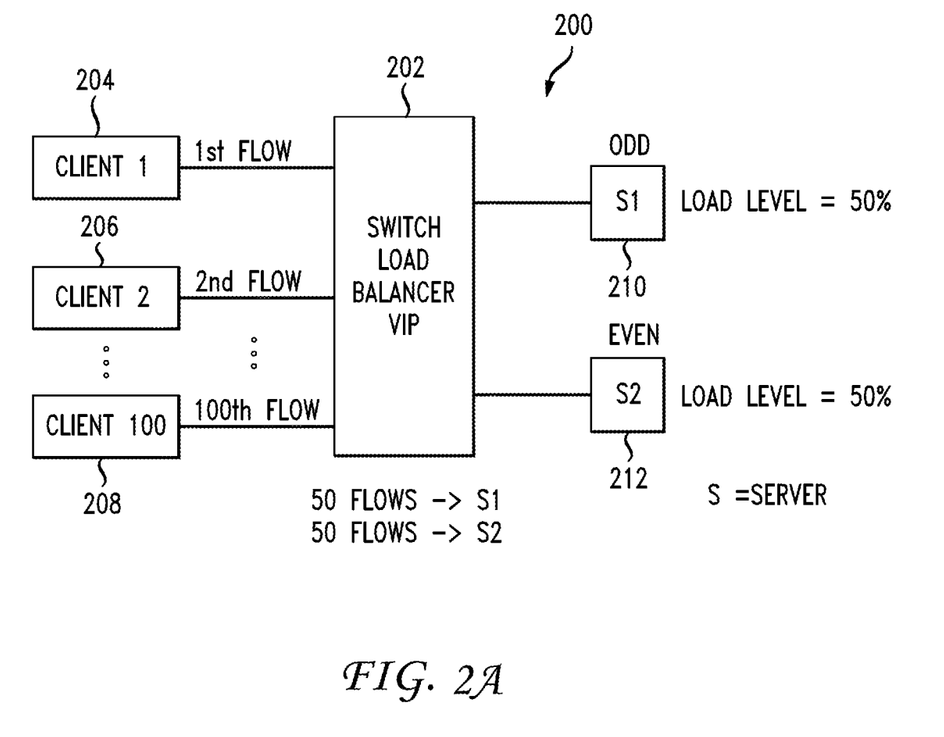
FIG. 2A illustrates a static rule-based load-balancing configuration.

FIG. 2A illustrates an example load-balancing approach in a system 200 including several clients 204, 206, 208 representing separate sources of flows which are directed to the switch 202. In this example, the switch includes a load balancer and maintains the full flow state. This switch 202 can be a component including a Virtual IP (VIP) which is a load-balancing instance where the users point their browsers to navigate to a chosen site. The switch or VIP 202 has an IP address, which must be publicly available to be accessible from public networks. Usually a TCP or UDP port number is associated with the VIP, such as TCP port 80 for web traffic.

In this example, clients 204, 206, 208 can represent 100 clients each transmitting a flow to the switch 202. The load-balancer component in the switch 202 divides the flows such that 50 of the 100 flows are directed to a first server 210 (the "odd" flows) and 50 of the 100 flows are directed to the second server 212 (the "even" flows). While load balancing can be achieved, the cost of maintaining the full flow state of this approach can be great. As shown in the figure, the first server 210 is considered at a 50% load level and the second server 212 is also at a 50% load level. This approach may not work well at high workloads as servers, which are already heavily loaded, can continue to get new requests based on the distribution of flows. For FIG. 2A, assume that the first server 210 is at a 99% utilization. Under the load balancer 202, the server 210 will continue to be assigned 50% of the incoming flows which would overwhelm the server 210. Further, a drawback of such systems, as is shown in FIG. 2A, is the fact that they need to store and maintain the full flow state.

Figure 2B:
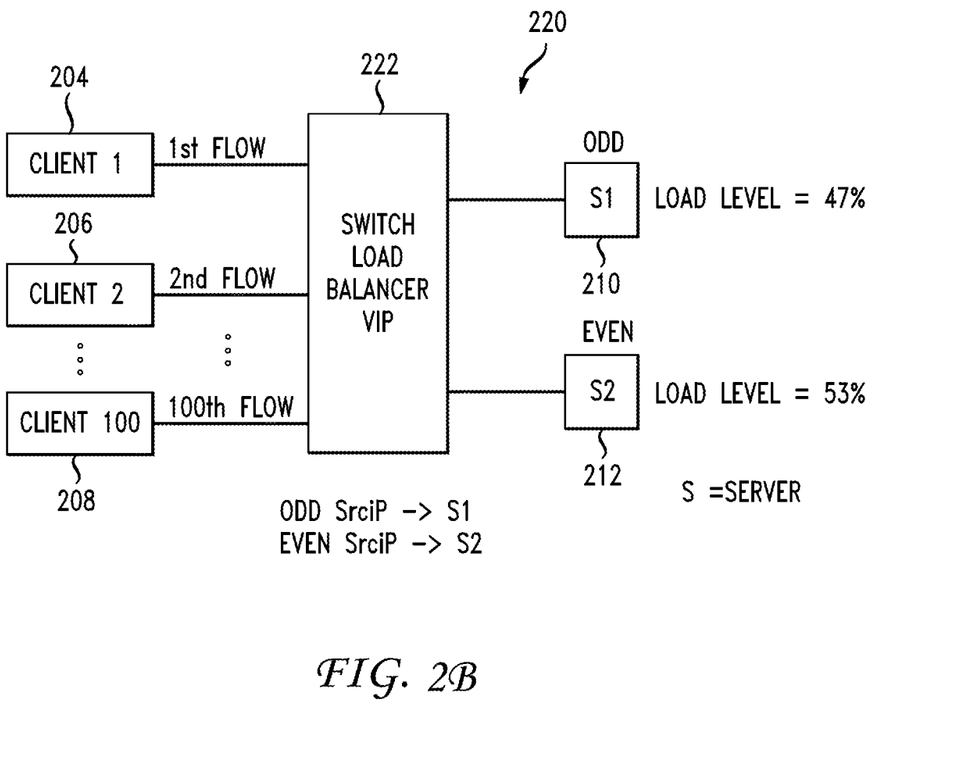
FIG. 2B illustrates application of an odd/even rule to load-balancing.

FIG. 2B illustrates an example of a static rule-based load-balancing approach. Assume in this case that the load level for the first server 210 in system 220 is 47%. Assume that the load level for the second server 212 is 53%. Under this approach, an odd/even static rule is applied which can result in the different load levels of 47% on the first server 210 and 53% on the even server 212. The dynamic load balancing approach of FIG. 2B keeps track of load on the servers and distributes load at even low workloads. This requires the per state information to be kept to track where each request needs to be sent. This approach would be difficult in high capacity datacenter switch 222.

The scheme outlined in FIG. 2B is beneficial from a switch implementation point of view as it does not require any state to be maintained at the switch 222. This can be called a server load balancer (SLB) 222. Note that in FIG. 2B, the load on the servers, however, is uneven. The first server 210 is at a 47% load level and the second server 212 is at a load level of 53%. Application of a static rule can lead to an unequal distribution of flows to servers.

Figure 2C:
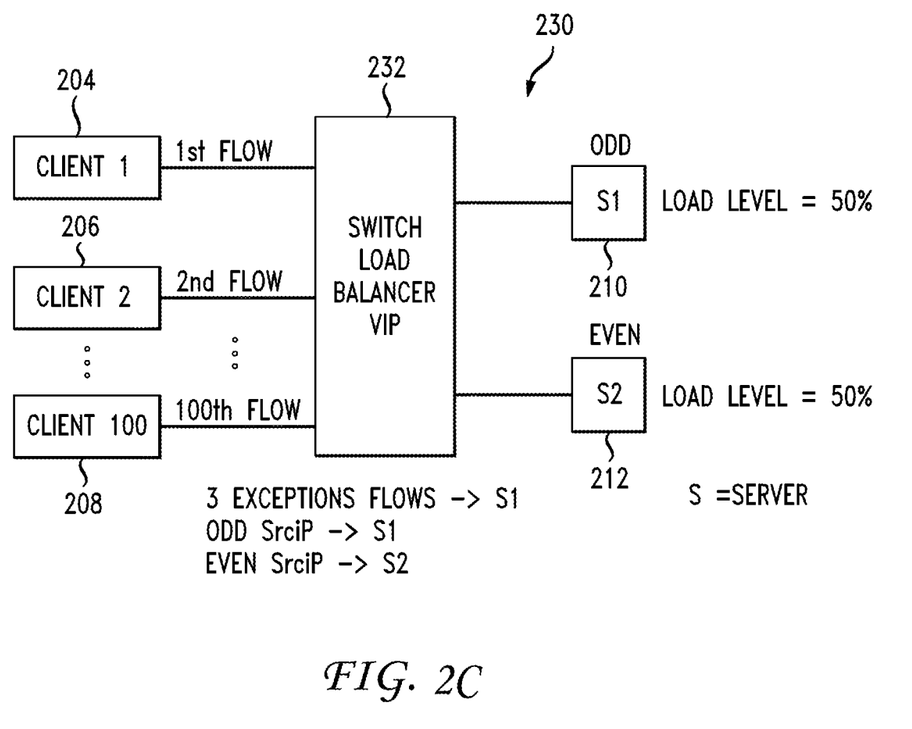
FIG. 2C illustrates an application of a static odd/even rule and several exception flows.

FIG. 2C illustrates an example approach that keeps the state information only for a small number of flows. The approach can correct for the uneven distribution of flows to servers as can be experienced via the static rule based approach. These flows are used as exceptions to a static distribution rule. This approach eliminates keeping flow state for a large number of flows that match the static rule, even when running an ideal load-balancing algorithm. Based on the number of exception flows, distribution as close to an ideal load balancing can be achieved.

In this approach, the system 230 includes a switch 232 that applies both a static rule such as an odd/even rule, but only stores flow tables for exceptions to that rule.

The concepts shown in FIG. 2C are as follows. First, a static policy can be implemented to distribute the load. The load then on each server 210, 212 is monitored to insure that each individual server 210,212 does not get overloaded. Any flows that are received that match the static rule can be distributed according to the rule while the traffic load is within the server's capacity. Thus, such flows are allowed to be distributed to the appropriate server according to the static rule and without the need of maintaining state or flow information at the switch 232.

If, based on the monitoring, it is determined that a server 210, 212 is operating a capacity or near capacity, when a new flow is received at the switch 232 and would be destined for that server according to the static rule, that flow is distributed to another server with a lower or lowest load by creating an exception to the static rule. The exception is stored at the switch 232. In one aspect, the exception rule is followed before the static rule for new flows received at the switch 232 that need to be distributed.

The subsequent packets for the new flow arrive at the server 232 and are distributed according to the exception rule to the new server that has spare capacity. The system can select the new server based on one or more factors such as the new server's load, its predicted load, its physical distance from the server that would receive the new flow under the static rule, its logical distance from the server that would receive the new flow under the static rule, its affinity for the new flow (i.e., does it have an operating system or hardware components that are more suited to the new flow relative to other servers), and so forth. An analysis could be performed on the new flow such that knowledge about its characteristics can be used to make the decision to create an exception rule. For example, if the new flow has a first characteristic, and that characteristic makes it desirable to be directed to a certain type of server, the system can analyze whether that certain type of server is available currently or when it would become available. Assume that the desired new server is not available for several minutes. In this scenario, the new flow can be held up until the desired server becomes available, or the system could route the new flow to the destination server based on the static rule temporarily, even if the destination server is at or near capacity. Then, once the preferred new server is available, the exception rule can be created and the new flow and any additional packets in that flow could be delivered to the new server.

Thus, there can be any number of parameters and factors that can be combined or used individually to make the decision of when to change from a static flow rule to an exception to the flow rule such that the transition can be efficient. Factors can include one or more of how many existing flow rules are stored, the load on the new server to which the exception rule would send the new flow, temperature, capacity and/or predicted capacity of any of the servers in the system, and so forth.

The exception flows can be aged to make sure the entries do not become stale. The aging process is similar to other aging algorithms on any flow switch. For example, an aggressive aging scheme can be employed under heavy loading to make sure that flows are utilized by so called elephant flows. In computer networking, an elephant flow is an extremely large (in total bytes) continuous flow set up by a TCP (or other protocol) flow measured over a network link. Elephant flows, though not numerous, can occupy a disproportionate share of the total bandwidth over a period of time.

Since only the exception flows are stored in the switch, and not the flows that follow the rule, this scheme requires much smaller flow tables to be stored than traditional flow tables.

An example shall illustrate the point. Assume that there are two servers 210, 212 that are using a static rule to send all even flows to one server 210 and all odd flows to the other 212. As shown in FIG. 2B, this can result in 47% of the flows going to the first server 210 and another 53% of the flows going to another server 212. Under this approach, the system can create a single static rule with 2 application control engines (ACEs) and distribution odd and even flows to different servers. Then the system can create exception rules and route flows to their proper destination. The exception rule can be increased only for a % of flows inserted above the static rule to make the load balancer distribute flows more evenly.

The above proposal uses the flow tables as exceptions to a general rule-based forwarding approach, instead of maintaining flow stat for all flows. This approach can make the effective utilization much higher.

In some cases, the approach disclosed herein does not and is not expected to produce perfect load balancing. At the same time, the performance is typically better than static load balancing. By sending different types of traffic to different places, the system can observe the load balancing characteristics of any server load balancer. Thus, if a server load balancer is not performing as an ideal load balancer, and in turn introducing small errors, the system can detect the reduced performance. The system or an individual can also query for all the flows in the switch through a command line interface or any other means. If the switch is unable to show all of the flows, then it can be presumed that the system is following a flow optimization technique. Lack of the full flow details combined with jitter in comparison to an ideal server load balancer can give a strong clue that this technique can be used in any load balancer.

Figure 3:
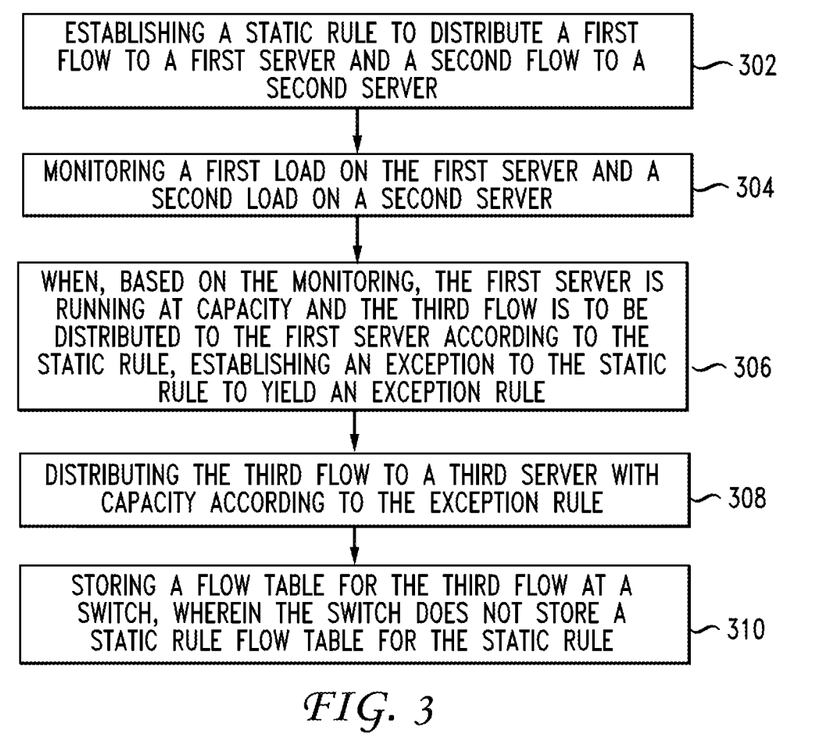
FIG. 3 illustrates a method embodiment.

FIG. 3 illustrates an example method. The method embodiment includes establishing a static rule to distribute a first flow to a first server and a second flow to a second server (302) and monitoring a first load on the first server and a second load on the second server (304). The static rules function differently from the process of storing a flow table because flows are simply managed according to the static rule such that no history of the assignments of flows to servers needs to be maintained at the switch. When, based on the monitoring, the first server is running at capacity and a third flow is to be distributed to the first server according to the static rule, the method includes establishing an exception to the static rule to yield an exception rule (306), distributing the third flow to a third server with capacity according to the exception rule (308) and storing a flow table for the third flow at a switch, wherein the switch does not store a static rule flow table for the static rule (310).

An example can help illustrate the point. Assume at a first time, say 12 PM, the first server is at capacity but the system receives a third flow that according to the static rule should be routed to the first server as soon as it is received. At a second time, which can be only slightly after the first time or later, the system establishes an exception to the static rule to yield the exception rule. Then, say at 12:03 PM, the third flow is received and needs to be routed to the appropriate server. With the creation of the exception rule, the third flow at 12:03 PM can be routed to the third server. Of course the timings can be much smaller such as in milliseconds or microseconds. The term "capacity" can be defined by a system administrator or other automatic means. For example, "capacity" could be 85% utilization with enough room to continue running applications on the server but not overwhelm the server. Capacity could be defined as 95% or 100% utilization as well, or any other value that indicates a full load or nearly a full load on the server. In general, the concept means that the server is running at a level in which adding additional streams to that server might cause it to fail or to not be able to continue to process the existing workload as well as the additional stream.

The benefit of this approach includes the fact that the entire flow table does not need to be stored at the switch. Most of the routing of flows occurs according to the static rule such that flow tables do not need to be stored and managed. The exception rule may require some flow table storage at the switch, although this is not always a given. Another aspect of the disclosure includes aging the third flow. In this regard, any mechanisms of aging can apply to remove older flow entries in the flow table for the third flow to make room for newer entries.

In one aspect, the method includes storing flow table entries at the switch for further exception rules to the static rule. Thus, only flows associated with the exception rules need be stored at the switch. Typically, distribution of flows follows the exception rule before the static rule. Thus, a hierarchy of rules could be established in which a certain rule is followed before another rule. The hierarchy could be in any order. The static rule could be first or one or more exception rules could be first. Further, the order of the rules being followed could be dynamic and could change based on one or more parameters such as availability of servers for processing workload, current performance between servers, predicted performance, server load, timing element based on an aging of a flow, a schedule of events or hierarchy orders, a fee paid, a load balancing parameter, type of workload, service level agreement requirements, workload affinities for certain hardware structures, and so forth. Thus, for example, the third flow may follow the exception rule first and be directed to the third server. The third server is determined to have sufficient capacity to receive and process the third flow. However, later flows may follow a different pattern or routing instruction based on one or more of the factors set forth above.

Based on one or more parameters, a fourth flow might follow the static rule first, the exception rule or might follow a new exception rule. The monitoring of flows might determine that the exception rules have worked and that new flows should return to following the static rule. A preference for returning as much as possible to the static rule can be implemented such that the amount of data stored in a flow table can be minimized.

In one aspect, a selection of the third server from a plurality of servers can be based at least in part on an analysis of one or more of the exception rule, the static rule, the first flow, the second flow, the third flow, the first server, the second server, the third server, hardware types, workload affinity, operating systems, service level agreement requirements, and so forth. Other factors could be used to select the third server. For example, one or more of the following factors could be a part of the analysis: a location of a server or node, scheduled workload for the third server, an analysis based on machine learning, and any other factor.

In another aspect, the selection of the third server from a plurality of servers can be made based at least in part on how much data is required to be stored in the flow table for the third flow for the third flow being distributed to the third server relative to other servers of the plurality of servers having capacity for distribution. In some cases, for example, a fourth server or other server may be chosen such that the system will know that the particular server chosen will result in less data being required for populating a flow table. Locations of servers, IP network structure, bottleneck scenarios, can all play into which server is chosen.

Figure 4:
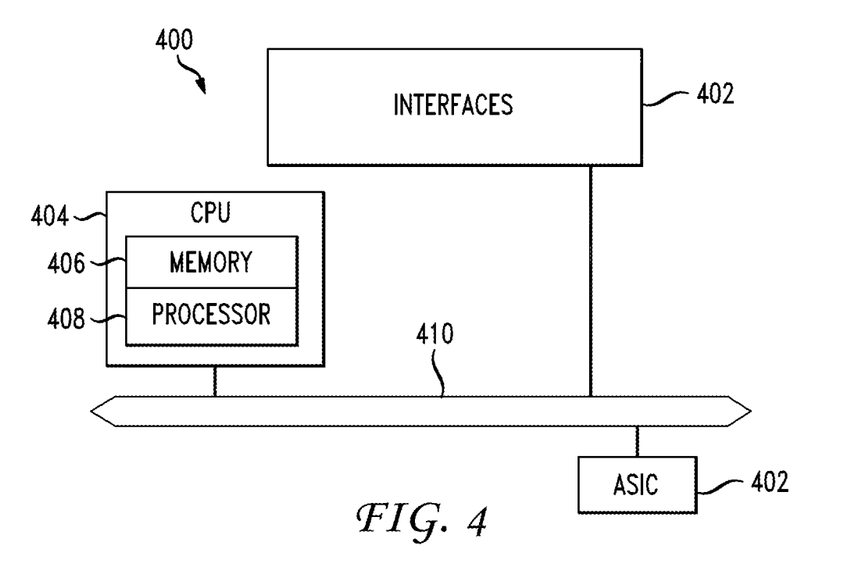
FIG. 4 illustrates and example network device.

FIG. 4 illustrates an example network device 400 suitable for performing switching, port identification, and/or port verification operations. Network device 400 includes a master central processing unit (CPU) 404, interfaces 402, and a bus 410 (e.g., a PCI bus). When acting under the control of appropriate software or firmware, the CPU 404 is responsible for executing packet management, error detection, and/or routing functions. The CPU 404 preferably accomplishes all these functions under the control of software including an operating system and any appropriate applications software. CPU 404 may include one or more processors 408 such as a processor from the Intel or Motorola family of microprocessors or the MIPS family of microprocessors. In an alternative embodiment, processor 408 is specially designed hardware for controlling the operations of network device 400. In a specific embodiment, a memory 406 (such as non-volatile RAM, a TCAM, and/or ROM) also forms part of CPU 404. However, there are many different ways in which memory could be coupled to the system.

The interfaces 402 are typically provided as interface cards (sometimes referred to as "line cards"). Generally, they control the sending and receiving of data packets over the network and sometimes support other peripherals used with the network device 400. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management. By providing separate processors for the communications intensive tasks, these interfaces allow the master microprocessor 404 to efficiently perform routing computations, network diagnostics, security functions, etc.

The network device 400 can also include an integrated circuit 412, such as an application-specific integrated circuit (ASIC). The integrated circuit 412 can communicate with other components via the bus 410. The integrated circuit 412 can include logic for custom or specific operations, such as switching operations, management operations, etc.

Although the system shown in FIG. 4 is one specific network device of the present invention, it is by no means the only network device architecture on which the present invention can be implemented. For example, an architecture having a single processor that handles communications as well as routing computations, etc. is often used. Further, other types of interfaces and media could also be used with the router.

Regardless of the network device's configuration, it may employ one or more memories or memory modules (including memory 406) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Typical examples of such form factors include laptops, smart phones, small form factor personal computers, personal digital assistants, rackmount devices, standalone devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims. Moreover, claim language reciting "at least one of" a set indicates that one member of the set or multiple members of the set satisfy the claim.

It should be understood that features or configurations herein with reference to one embodiment or example can be implemented in, or combined with, other embodiments or examples herein. That is, terms such as "embodiment", "variation", "aspect", "example", "configuration", "implementation", "case", and any other terms which may connote an embodiment, as used herein to describe specific features or configurations, are not intended to limit any of the associated features or configurations to a specific or separate embodiment or embodiments, and should not be interpreted to suggest that such features or configurations cannot be combined with features or configurations described with reference to other embodiments, variations, aspects, examples, configurations, implementations, cases, and so forth. In other words, features described herein with reference to a specific example (e.g., embodiment, variation, aspect, configuration, implementation, case, etc.) can be combined with features described with reference to another example. Precisely, one of ordinary skill in the art will readily recognize that the various embodiments or examples described herein, and their associated features, can be combined with each other.

A phrase such as an "aspect" does not imply that such aspect is essential to the subject technology or that such aspect applies to all configurations of the subject technology. A disclosure relating to an aspect may apply to all configurations, or one or more configurations. A phrase such as an aspect may refer to one or more aspects and vice versa. A phrase such as a "configuration" does not imply that such configuration is essential to the subject technology or that such configuration applies to all configurations of the subject technology. A disclosure relating to a configuration may apply to all configurations, or one or more configurations. A phrase such as a configuration may refer to one or more configurations and vice versa. The word "exemplary" is used herein to mean "serving as an example or illustration." Any aspect or design described herein as "exemplary" is not necessarily to be construed as preferred or advantageous over other aspects or designs.

Moreover, claim language reciting "at least one of" a set indicates that one member of the set or multiple members of the set satisfy the claim. For example, claim language reciting "at least one of A, B, and C" or "at least one of A, B, or C" means A alone, B alone, C alone, A and B together, A and C together, B and C together, or A, B and C together.

What is claimed is:

1. A method comprising:
   establishing a static rule to distribute a first flow to a first server and a second flow to a second server;
   monitoring a first load on the first server and a second load on the second server;
   receiving a third flow to be distributed to the first server according to the static rule;
   determining, via the monitoring, the first server is running at capacity;
   establishing an exception to the static rule to yield an exception rule based on the first server running at capacity, one or more characteristics of the third flow being associated with a third server separate from the first server and second the second server, and an amount of data needed for storage at a flow table of a switch in response to distributing the third flow to the third server, wherein the flow table includes exceptions to static rules for forwarding a plurality of flows without maintaining state information for all of the plurality of flows;
   distributing the third flow to the third server with capacity according to the exception rule before the static rule; and
   storing the flow table for the third flow at the switch in response to application of the exception rule to the third flow, wherein the switch refrains from storing a static rule flow table for the static rule.

2. The method of claim 1, further comprising:
   aging the third flow.

3. The method of claim 1, further comprising:
   storing flow table entries at the switch for further exception rules to the static rule.

4. The method of claim 1, wherein the third server is determined to have sufficient capacity to receive and process the third flow.

5. The method of claim 1, wherein a selection of the third server from a plurality of servers is based at least in part on an analysis of one or more of the exception rule, the static rule, the first flow, the second flow, the third flow, the first server, the second server and the third server.

6. The method of claim 1, wherein a selection of the third server from a plurality of servers is made based at least in part on how much data is required to be stored in the flow table for the third flow for the third flow being distributed to the third server relative to other servers of the plurality of servers having capacity for distribution.

7. A system comprising:
   a processor; and
   a computer-readable storage device storing instructions which, when executed by the processor, cause the processor to perform operations comprising:
   establishing a static rule to distribute a first flow to a first server and a second flow to a second server;
   monitoring a first load on the first server and a second load on the second server;
   receiving a third flow to be distributed to the first server according to the static rule;

determining, via the monitoring, the first server is running at capacity;
establishing an exception to the static rule to yield an exception rule based on the first server running at capacity, one or more characteristics of the third flow being associated with a third server separate from the first server and second the second server, and an amount of data needed for storage at a flow table of a switch in response to distributing the third flow to the third server, wherein the flow table includes exceptions to static rules for forwarding a plurality of flows without maintaining state information for all of the plurality of flows;
distributing the third flow to the third server with capacity according to the exception rule before the static rule; and
storing the flow table for the third flow at the switch in response to application of the exception rule to the third flow, wherein the switch refrains from storing a static rule flow table for the static rule.

8. The system of claim 7, wherein the computer-readable storage device stores further instructions which, when executed by the processor, cause the processor to perform operations comprising further comprising:
aging the third flow.

9. The system of claim 7, wherein the computer-readable storage device stores further instructions which, when executed by the processor, cause the processor to perform operations comprising further comprising:
storing flow table entries at the switch for further exception rules to the static rule.

10. The system of claim 7, wherein the third server is determined to have sufficient capacity to receive and process the third flow.

11. The system of claim 7, wherein a selection of the third server from a plurality of servers is based at least in part on an analysis of one or more of the exception rule, the static rule, the first flow, the second flow, the third flow, the first server, the second server and the third server.

12. The system of claim 7, wherein a selection of the third server from a plurality of servers is made based at least in part on how much data is required to be stored in the flow table for the third flow for the third flow being distributed to the third server relative to other servers of the plurality of servers having capacity for distribution.

13. A non-transitory computer-readable storage device storing instructions which, when executed by a processor, cause the processor to perform operations comprising:
establishing a static rule to distribute a first flow to a first server and a second flow to a second server;
monitoring a first load on the first server and a second load on the second server;
receiving a third flow to be distributed to the first server according to the static rule;
determining, via the monitoring, the first server is running at capacity;
establishing an exception to the static rule to yield an exception rule based on the first server running at capacity, one or more characteristics of the third flow being associated with a third server separate from the first server and second the second server, and an amount of data needed for storage at a flow table of a switch in response to distributing the third flow to the third server, wherein the flow table includes exceptions to static rules for forwarding a plurality of flows without maintaining state information for all of the plurality of flows;
distributing the third flow to the third server with capacity according to the exception rule before the static rule; and
storing the flow table for the third flow at the switch in response to application of the exception rule to the third flow, wherein the switch refrains from storing a static rule flow table for the static rule.

14. The non-transitory computer-readable storage device of claim 13, wherein the non-transitory computer-readable storage device stores further instructions which, when executed by the processor, cause the processor to perform operations comprising further comprising:
aging the third flow.

15. The non-transitory computer-readable storage device of claim 13, wherein the non-transitory computer-readable storage device stores further instructions which, when executed by the processor, cause the processor to perform operations comprising further comprising:
storing flow table entries at the switch for further exception rules to the static rule.

16. The non-transitory computer-readable storage device of claim 13, wherein the third server is determined to have sufficient capacity to receive and process the third flow.

17. The non-transitory computer-readable storage device of claim 13, wherein a selection of the third server from a plurality of servers is based at least in part on an analysis of one or more of the exception rule, the static rule, the first flow, the second flow, the third flow, the first server, the second server and the third server.

* * * * *